United States Patent
Yoon et al.

(10) Patent No.: US 7,026,000 B2
(45) Date of Patent: *Apr. 11, 2006

(54) METHOD FOR PREPARING A CANDY HAVING A STEREOSCOPIC PICTURE BY PAD PRINTING

(75) Inventors: Jeong-Min Yoon, Anyang-si (KR); Byong Kwon Park, Anyang-si (KR)

(73) Assignee: Jeong Min Yoon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/050,998

(22) Filed: Jan. 22, 2002

(65) Prior Publication Data

US 2002/0142074 A1    Oct. 3, 2002

(30) Foreign Application Priority Data

Feb. 15, 2001    (KR) .......................................... 2001-7587

(51) Int. Cl.
*A23G 3/00* (2006.01)

(52) U.S. Cl. ....................... 426/383; 426/515; 426/250; 426/87; 426/104

(58) Field of Classification Search .................... 426/87, 426/104, 383, 515, 250
See application file for complete search history.

(56) References Cited

U.S. PATENT DOCUMENTS

| | | | |
|---|---|---|---|
| 1,502,006 A | * | 7/1924 | Alvord |
| 2,895,832 A | * | 7/1959 | Bersey |
| 3,215,536 A | * | 11/1965 | Simgone et al. |
| 3,258,347 A | * | 6/1966 | Brown |
| 3,463,645 A | * | 8/1969 | Kane |
| 4,168,662 A | * | 9/1979 | Fell |

(Continued)

FOREIGN PATENT DOCUMENTS

| | | | |
|---|---|---|---|
| DE | 691 01 272 T2 | | 5/1991 |
| EP | 447733 | * | 9/1991 |
| EP | 462093 | * | 12/1991 |
| EP | 734655 | * | 10/1996 |
| FR | 2213022 | * | 10/1972 |
| FR | 2763794 | * | 12/1998 |
| GB | 838948 | * | 8/1958 |
| GB | 1441446 | * | 6/1976 |
| JP | 57-12956 | * | 1/1982 |

(Continued)

OTHER PUBLICATIONS

Translation of Official Action from German Patent and Trademark Office dated Mar. 25, 2003.

Meiners, A., Kreiten, K., Joike, H.: Silesia Confiserie Manual No. 3 "Das NEUE Handbuch der SuBwarenindustrie", vol. 2, Neuss 21: Silesia–Essenzfabrik Gerhard Hanke K.G., Abt. Fachbucherei (technical book section), 1983.

*Primary Examiner*—Steve Weinstein
(74) *Attorney, Agent, or Firm*—Anderson Kill & Olick, PC

(57) ABSTRACT

The present invention relates to methods for preparing a candy having a stereoscopic picture therein comprising the step of pouring a measured amount of the first mixture, prepared by dissolving and concentrating the raw materials, for candy into a mold, while a temperature of the mixture is maintained at of about 130 to 150° C.; partially cooling the first mixture at about 30 to 45° C. of its surface temperature; printing desired pictures by using a pad printing method with one or more of black, yellow, red, and blue edible ink compositions onto the mixture at a temperature of about 15 to 25° C. and a relative humidity of 40 to 60%, and then drying the mixture; pouring a measured amount of the second mixture, prepared by dissolving and concentrating the raw materials, for candy into the mold atop the first mixture, while a temperature of the second mixture is maintained at about 120 to 135° C.; and cooling the resulting mixture.

3 Claims, 1 Drawing Sheet

U.S. PATENT DOCUMENTS

| | | | | |
|---|---|---|---|---|
| 4,578,273 | A | * | 3/1986 | Krubert |
| 5,002,775 | A | * | 3/1991 | Toya et al. |
| 5,006,362 | A | * | 4/1991 | Hilborn |
| 5,142,976 | A | * | 9/1992 | Rolleau |
| 5,643,667 | A | * | 7/1997 | Tsukioka |
| 5,800,601 | A | * | 9/1998 | Zou et al. |
| 5,834,047 | A | * | 11/1998 | Ahn |
| 6,084,619 | A | * | 7/2000 | Takemoto et al. |
| 6,267,997 | B1 | * | 7/2001 | Ream et al. |

FOREIGN PATENT DOCUMENTS

| | | | |
|---|---|---|---|
| JP | 62-36151 | * | 2/1987 |
| JP | 1-178564 | * | 7/1989 |
| JP | 3-39044 | * | 2/1991 |
| JP | 6-172691 | * | 6/1994 |
| JP | 8-176 | * | 1/1996 |
| WO | WO-78157 | * | 12/2000 |

* cited by examiner

METHOD FOR PREPARING A CANDY HAVING A STEREOSCOPIC PICTURE BY PAD PRINTING

FIELD OF THE INVENTION

The present invention relates to a method for preparing a candy having a stereoscopic picture by using a pad printing method and a candy product prepared by using the same. More particularly, the present invention relates to a candy product, in which various letters, character designs, images, pictures, and the like may be distinctly printed therein and a method for preparing the same.

BACKGROUND OF THE INVENTION

Candy has a sweet taste, so it has been loved by many people, regardless of their age for a long time. Especially, young generations of infants to twenties are apt to select candies by their appearance i.e. shapes, colors, printed images rather than their taste. Recently, many attempts have been thus made to prepare candies having various images and peculiar shapes so as to arouse the devotees' interests and thereby improve the marketability of the products. Conventionally, pictures for a candy have been printed on its packing paper or attached thereto as a form of sticker. In general, it is not difficult to change the external shape of the candy, or to print simple images thereon. However, on considering the physical properties and the manufacturing process of candies, there exists a limit in enhancing the visual effects and the value of the candies by printing various colorful designs, e.g. characters, images, pictures, and the like (hereinafter referred to as "pictures") therein and in making the pictures remain unchanged for a long time, even during ingesting the candy.

Typically, technologies for printing various pictures in a candy may be divided into two ways: one is to insert edible film into the candy and the other is to print the pictures directly onto the candy.

In the method of using edible film, it has problems of a high cost resulting from the addition of a process for manufacturing the film and from the waste disposal of the remaining film, and of feeling foreign matter in the mouth during ingestion. Especially, it has a problem which is incapable of showing distinct pictures in the candy since the film is contracted at a high temperature upon shaping the candy.

For printing pictures directly on a candy, a pad-printing technology is applied. The pad printing technology generally is comprised of preparing each color separation film and each etching plate, and then printing pictures with edible inks onto the candy. The conventional pad-printing technology has been used for printing pictures on a preformed resin such as a hard container, lid, and package for a product. Therefore, it is difficult to control the condition of the process and the combination of the edible ink composition for printing a picture onto the materials which are not completely cooled (e.g. as printed in the interior of a candy during the manufacturing process).

Generally, the quality of images is determined according to conditions for processing a candy. If the cooling time after first filling the candy mixture into the mold is too long, the workability becomes worse; also if the difference of temperature between the first filling and the second filling is too great, printed pictures and the distinctness becomes worse. Furthermore, conventional edible ink for candy is generally diluted with water, whereby various colorful pictures cannot be printed clearly and sharply. In the depositing technology, which is a typical process for manufacturing a candy for its advantage capable of using various molds, the pad printing method can be used for printing a simple picture into the candy, but it is not possible to print pictures, for example, an exquisite photograph of a high-resolution.

The present inventor has extensively studied how to distinctively print the pictures in the interior of the candy to the extent of the actual pictures. As a result, the present inventor has developed a method for preparing a candy by applying a pad printing technology and using edible ink compositions, by which various pictures may be expressed in the candy with clear shapes and high-resolution.

SUMMARY OF THE INVENTION

A feature of the present invention is to provide a method for preparing candy products having a stereoscopic picture by using a pad-printing technology, by which pictures having various colors and shapes may be printed distinctively and exquisitely.

Another feature of the present invention is to provide optimum conditions of process for manufacturing candies printed with a stereoscopic picture therein, in which a pad printing method may be applied to conventional depositing equipment.

Another feature of the present invention is to provide candy products having a stereoscopic picture therein by using a pad printing technology, in which pictures may remain unchanged while they are consumed.

Another feature of the present invention is to provide edible ink compositions by which a high-resolution picture may be distinctly printed in the interior of the candy.

In order to achieve the above features, a method for manufacturing candy products having a stereoscopic picture utilizing edible ink compositions is provided and is comprised of the following steps:

pouring a measured amount of the first mixture, prepared by dissolving and concentrating the raw materials for candy into a mold, while the temperature of the mixture is maintained at about 130 to 150° C. during the procedure; partially cooling the first mixture to about 30 to 45° C. of its surface temperature; printing a desired picture by using a pad printing method with black, yellow, red, and blue edible ink compositions on to the mixture at about 15 to 25° C. and a relative humidity of 40 to 60%, and then drying said mixture; pouring a measured amount of the second mixture, having been dissolved and concentrated the raw materials for the candy onto said mixture printed pictures, while the temperature of the second mixture is maintained at about 120 to 135° C.; and cooling the mixture to obtain the final product.

In the edible ink compositions, the black ink composition comprises 70 to 81% by volume of ethanol, 1 to 8% by volume of shellac (E904), 0.1 to 3% by volume of carnauba wax (E903), 0.1 to 3% by volume of yellow No. 4 aluminum lake, 0.1 to 4% by volume of red No. 40 aluminum lake, and 0.1 to 4% by volume of blue No. 1 aluminum lake. The yellow ink composition comprises 70 to 88% by volume of ethanol, 1 to 10% by volume of shellac, 0.1 to 5% by volume of Carnauba wax, and 0.1 to 5% by volume of yellow No. 4 aluminum lake. The red ink composition comprises 70 to 85% by volume of ethanol, 1 to 10% by volume of shellac, 0.1 to 5% by volume of carnauba wax, and 0.1 to 3% by volume of red No. 40 aluminum lake. The blue ink composition comprises 70 to 88% by volume of ethanol, 1 to 8% by volume of shellac, 0.1 to 3% by volume of carnauba wax, and 0.1 to 3% by volume of blue No. 1 aluminum lake.

Among the edible ink compositions, blue No. 1 aluminum lake (Brilliant blue FCF), yellow No. 4 aluminum lake (Tartrazine), and red No. 40 aluminum lake (Allura red AC) are called FD & C blue No. 1, FD & C yellow No. 5, and FD & C red No. 40 in America, and as E133, E102, and E129 in Europe, respectively. Furthermore, shellac and carnauba wax are called E904 and E903 in Europe, respectively.

The present invention can express various shapes and characters directly on or in the confectionery products by using edible ink compositions, thereby improving the marketability of the products. Meanwhile, the method and edible ink compositions can be generally applied to a transparent candy product, but also applied to any confectionery product.

In the context of this application, "picture" is construed broadly to include a photograph, character, drawing, etc, and "candy" is also construed broadly to include various confectionary products such as hard candy and soft candy. It can be understood that another specific element also includes all technical equivalents which operate in a similar manner to accomplish a similar purpose.

BRIEF DESCRIPTION OF THE DRAWINGS

The above, and other features and advantages of the present invention, will be apparent to those skilled in the art from the following detailed description, taken together with the accompanying drawing, in which.

DETAILED DESCRIPTION OF THE INVENTION

Figure 1:
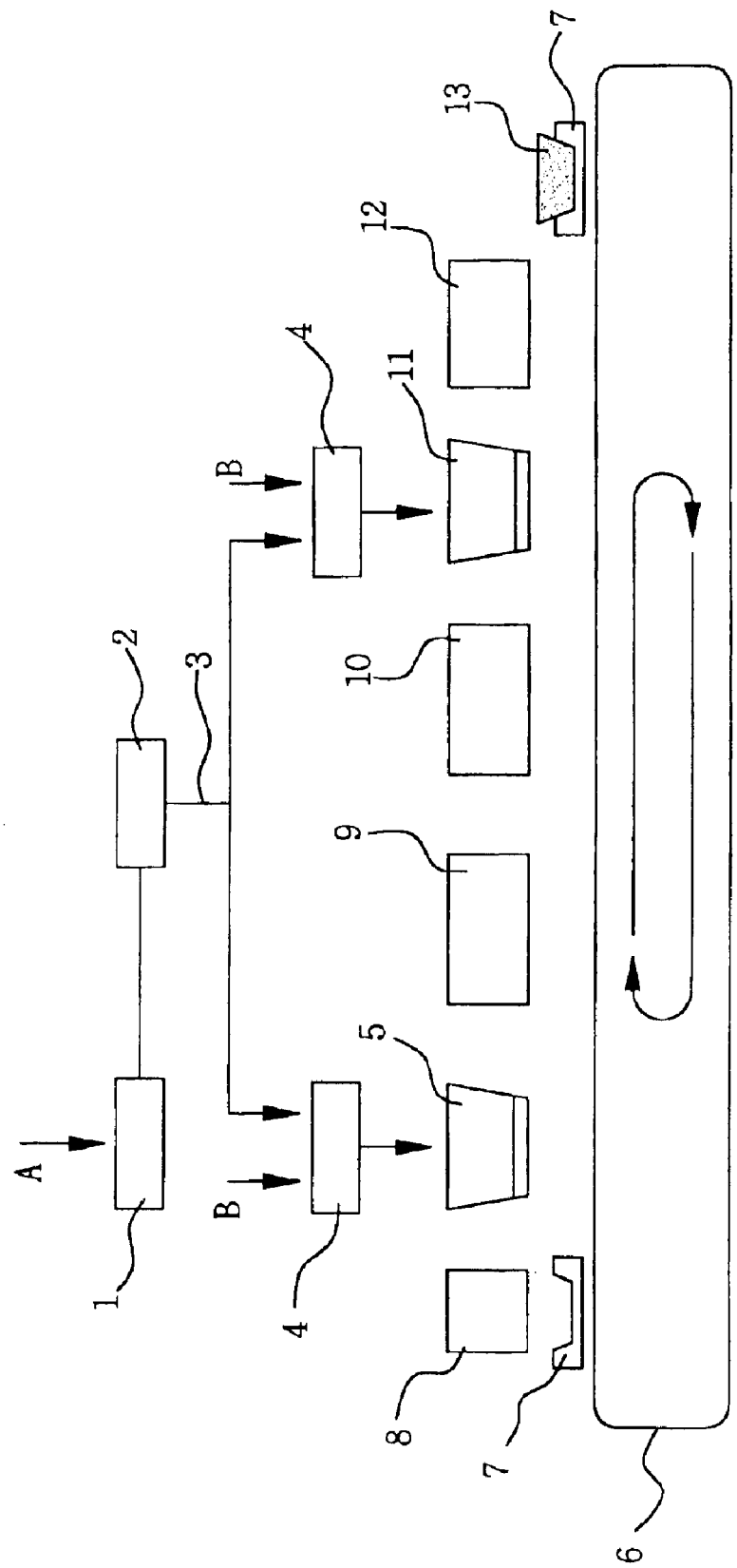
FIG. 1 is a flow chart of process for manufacturing a stick candy having a stereoscopic picture according to the present invention.

The preferred embodiment of the methods for manufacturing a candy having stereoscopic pictures with a high-resolution by using edible ink compositions, which comprises the steps of:

pouring a measured amount of the first mixture, prepared by dissolving and concentrating the raw materials for candy into a mold, while the temperature of the mixture is maintained at about 130 to 150° C. during the procedure; partially cooling the first mixture to about 30 to 45° C. of its surface temperature; printing a desired picture by using a pad printing method with black, yellow, red, and blue edible ink compositions on to the mixture at about 15 to 25° C. and a relative humidity of 40 to 60%, and then drying said mixture; pouring a measured amount of the second mixture, having been dissolved and concentrated the raw materials for the candy onto said mixture printed pictures, while the temperature of the second mixture is maintained at about 120 to 135° C.; and cooling the mixture to obtain the final product.

As an embodiment of the present invention, a manufacturing operation for a candy product will be explained in detail.

The method for manufacturing a candy product according to the present invention comprises the first cooling step, the printing step, and the second cooling step.

The first cooling step comprises dissolving, concentrating, and cooling of the raw materials for the candy. The raw materials for candy typically include sugar, starch syrup, water, and other additives such as a flavoring agent, a coloring agent, and the like. In the present invention, it is not limited to the above compositions, and any optional components and additives may be used to make a desired candy. Any optional components and the compositions may be determined by those skilled in the art.

First, the raw materials for candy are dissolved in a dissolver and then concentrated in a cooker under reduced pressure. It is preferable to maintain the temperature of the cooker of 140 to 150° C. and the pressure of the cooker of 100 to 300 mmHg. Once the mixture is concentrated to the desired viscosity, the concentrated mixture is then poured together with other additives into a mold, while maintaining the mixture at a temperature of about 130 to 150° C. The additives are lactic acid, a flavoring agent, a coloring agent, and the like, and these materials may be selected by taking into consideration the taste, flavor, and color of candies to be prepared. Alternatively, in order to prepare a stick candy, a further process for inserting a stick may be used prior to pouring of the concentrated mixture into the mold.

The above mixture is cooled to form a desired shape until its surface temperature becomes 30 to 45° C. It is important to control the cooling temperature in the first cooling step, which is an indispensable step for a subsequent printing process. If the surface temperature of the mixture is excessively cooled lower than 30° C., the surface of the mixture is broken into pieces on printing and the pieces stick to the pad, thereby resulting in scratching or partial masking of the etching plate. Meanwhile, if the surface temperature is higher than 45° C., the candy mixture cannot be sufficiently cooled. As a result, the edible ink smeared on the pad is mixed with the candy mixture to decrease the quality of the printed picture and the mixture is sunken by pressure applied thereon.

After the mixture is solidified to some extent by the first cooling, a desired picture may be printed onto the mixture by a pad printing method. Prior to pad printing, it is necessary to prepare the etching plates in accordance with pictures to be printed, to attach the etching plates to a printer, and to fill the edible ink into the printer. Since various colors and shapes may be expressed in the interior of the candy in accordance with the present invention, a broad spectrum of pictures may be selected.

In general, the pad printing may be carried out with four colors. The number of colors may be selected by those skilled in the art according to the desired picture to be printed. Though the number of colors on printing may be determined by those skilled in the art, four colors of printing are preferred to obtain a high-resolution picture of various colors. In a preferred embodiment of the present invention, black, red, blue, and yellow edible ink compositions are sequentially used. The compositions of the edible inks are shown in Table 1. All of the percents are based on volume.

TABLE 1

|  | Black ink | Yellow ink | Red ink | Blue ink |
|---|---|---|---|---|
| Ethanol | 70–81% | 70–88% | 70–85% | 70–88% |
| Shellac (E904) | 1–8% | 1–10% | 1–10% | 1–8% |
| Carnauba wax (E903) | 0.1–3% | 0.1–5% | 0.1–5% | 0.1–3% |
| Yellow No. 4 aluminum lake (Tartrazine) | 0.1–3% | 0.1–5% | — | — |
| Red No. 40 aluminum lake (Allura red AC) | 0.1–4% | — | 0.1–3% | — |
| Blue No. 1 aluminum lake (Brilliant Blue FCF) | 0.1–4% | — | — | 0.1–3% |

The above edible ink compositions include a drying retardant such as ethanol, propylene glycol, and shellac solution. The shellac solution comprising 31.4% by volume of shellac, 63.2% by volume of ethanol, and 5.4% by volume of glycerin ester of fatty acid which is the most preferable as a drying retardant. The ratio of the drying retardant is preferably 15 to 20% by volume for black, yellow, or blue ink composition, and 25 to 30% by volume for red ink composition, based on the edible ink composition.

Preferably, each color is to dry for 5 to 10 seconds when a picture is printed onto the candy, and the tolerable deviation of a mold and an etching plate is 1 mm or less when they are transferred along the conveyer.

It is preferable to carry out the above printing process at a temperature of 15 to 25° C. and a relative humidity of 40 to 60%.

Upon completing the pad printing process, the second cooling process is carried out, which is comprised of dissolving and concentrating raw materials for candy, and molding the resulting raw materials by cooling. The dissolved and concentrated raw materials and the additives are poured atop the first mixture of printed pictures. The compositions of the raw materials for the second candy mixture may be the same or different with those of the first candy mixture, and the dissolving and concentrating processes of the second mixture may be carried out with those of the first mixture as mentioned above.

The temperature of the second mixture to be poured into the mold is preferably 120 to 135° C. If the temperature of said mixture is less than 120° C., the mixture cannot be dispersed well in the mold since the viscosity of the mixture is too high. On the contrary, if the temperature of said mixture is greater than 135° C., the colors of the printed pictures may be discolored.

After pouring the second mixture into the mold, the mixture is cooled. It is also important to control the temperature in the second cooling, since rapid cooling results in deformation of the printed pictures through the sudden contraction of the mixture. Thus, the second cooling commences at 20 to 25° C., and then is dropped gradually 10 to 15° C. The total cooling time may be determined according to the amount and the shape of the mixture to be poured into the mold.

The amounts of the mixture in the first pouring and the second pouring may be optionally controlled according to the desired shape of the candy.

Any conventional mold may be used to prepare candy products according to the present invention.

The present invention is described in detail with reference to the FIGURE.

PREFERRED EMBODIMENT OF THE INVENTION

An embodiment for preparing a stick candy by using a pad printing method is described in detail below by referring to FIG. 1.

Raw materials (A) for candy such as sugar, starch syrup, water, etc. are dissolved in a dissolver 1. The dissolved raw materials are transferred into a cooker 2 and then concentrated at a temperature of 140 to 150° C. under the pressure of 100 to 300 mmHg until the desired viscosity is obtained. The concentrated mixture is transferred to a mixer 4 through a transfer pump 3 and then mixed with additives (B) such as flavoring agents, coloring agents, and the like. Thereafter, the resulting mixture is poured into a first depositor 5 through a nozzle. A stick is inserted in a mold 7 by a stick injection device 8. While the mold is moved on a transfer device 6 such as a conveyer, the mixture is poured into the mold from the first depositor. The mold, filled with the mixture, passes through the first cooling tunnel 9, thereby partially cooling said mixture to its surface temperature of 30 to 45° C.

The first mixture is then passed over a pad printer 10, equipped with etching plates, by a transfer device, in which a desired picture is printed onto the mixture through four colors of printing which are generally used for a pad printing as shown in FIG. 1. The number of colors on printing may be controlled according to the picture to be printed.

Upon completing the printing process, the raw materials (A) for candy and additives (B), with a measured amount, are poured into the mold atop the first mixture from the second depositor 11. The compositions of the second mixture may be the same as those of the first mixture, but they may be optionally controlled. The mixture is blended, dissolved, and concentrated as the first mixture. It is preferable to maintain the mixture to be supplied into the mold with a temperature of about 120 to 135° C. Upon completion of supplying the second mixture into the mold, said mixture is passed over the second cooling tunnel 12, and then cooled. Thereafter, a stick candy 13 having a desired stereoscopic picture may be obtained by separating it from the mold. It is preferable to maintain the inlet temperature of the cooling tunnel with 20 to 25° C. and the outlet temperature of the cooling tunnel with 10 to 15° C. in order to preserve the printed picture with a high-resolution.

While the present invention has been described with reference to the preferred embodiment thereof, it will be understood by those skilled in the art that various changes in form and details may be made therein without departing from the spirit and scope of the invention as defined by the appended claims.

What is claimed is:

1. Method for preparing candy having a stereoscopic picture comprising:

pouring a measured amount of a first mixture, prepared by dissolving and concentrating the raw materials for candy, into a mold, while the temperature of the first mixture is maintained at a temperature of about 130 to 150° C.;

partially cooling the first mixture until its surface temperature is about 30 to 45° C. to solidify the first mixture to an extent sufficient to allow for pad printing;

printing desired pictures by using a pad printing method with one or more differently colored edible ink compositions onto the first mixture wherein the printing process is carried out at a temperature of about 15 to 25° C. and a relative humidity of 40 to 60%, and then drying the first mixture and the one or more differently colored edible ink compositions on the first mixture;

pouring a measured amount of a second mixture prepared by dissolving and concentrating the raw materials for candy into the mold atop the printed first mixture, while the temperature of the second mixture is maintained at about 120 to 135° C.; and then cooling the second mixture, wherein each of said one or more differently colored edible ink compositions comprises ethanol, shellac, and carnauba wax, and an edible ink of either black, yellow, red, or blue color respectively with the black ink composition comprising 70 to 81% by volume of ethanol, 1 to 8% by volume of shellac, 0.1 to 3% by volume of carnauba wax, 0.1 to 3% by volume of yellow No. 4 aluminum lake, 0.1 to 4% by volume of red No. 40 aluminum lake, and 0.1 to 4% by volume of blue No. 1 aluminum lake; the yellow ink composition comprising 70 to 88% by volume of ethanol, 1 to 10% by volume of shellac, 0.1 to 5% by volume of carnauba wax, and 0.1 to 5% by volume of yellow No. 4 aluminum lake, the red ink composition comprising 70 to 85% by volume of ethanol, 1 to 10% by volume of shellac, 0.1 to 5% by volume of carnauba wax, and 0.1 to 3% by volume of red No. 40 aluminum lake; and the blue ink composition comprising 70 to 88% by volume of ethanol, 1 to 8% by volume of shellac, 0.1 to 3% by volume of carnauba wax, and 0.1 to 3% by volume of blue No. 1 aluminum lake.

2. The method for preparing a candy of claim 1, wherein said edible ink compositions comprises a drying retardant.

3. The method for preparing a candy of claim 2, which further comprises inserting a stick into the first mixture by a stick injection device after concentrating said mixture.

* * * * *